United States Patent
Miller, II

(10) Patent No.: US 7,627,326 B1
(45) Date of Patent: Dec. 1, 2009

(54) SPECTRUM MANAGEMENT SYSTEM FOR MUNICIPAL SPECTRUM USING GUIDED COGNITIVE RADIO

(75) Inventor: Robert Raymond Miller, II, Morris County, NJ (US)

(73) Assignee: AT&T Corp., New York, NY (US)

( * ) Notice: Subject to any disclaimer, the term of this patent is extended or adjusted under 35 U.S.C. 154(b) by 414 days.

(21) Appl. No.: 11/250,988

(22) Filed: Oct. 14, 2005

(51) Int. Cl.
*H04W 72/00* (2009.01)
(52) U.S. Cl. .............. 455/454; 455/404.1; 455/435.2; 455/435.3; 455/509; 455/512; 455/521; 455/527; 455/528; 455/423; 455/448; 455/452; 455/67.11; 455/63.1; 455/464
(58) Field of Classification Search .............. 455/404.1, 455/435.2, 435.3, 509, 512, 521, 527, 528, 455/454, 423, 448, 452, 67.11, 63.1
See application file for complete search history.

(56) References Cited

U.S. PATENT DOCUMENTS

| | | | |
|---|---|---|---|
| 6,259,922 B1 | 7/2001 | Benveniste | |
| 6,351,643 B1 * | 2/2002 | Haartsen | ...................... 455/450 |
| 6,615,040 B1 * | 9/2003 | Benveniste | .................. 455/423 |
| 6,771,957 B2 | 8/2004 | Chitrapu | |
| 6,775,549 B2 * | 8/2004 | Benveniste | ................ 455/452.1 |
| 6,876,864 B1 | 4/2005 | Chapin | |
| 6,882,851 B2 * | 4/2005 | Sugar et al. | .................. 455/454 |
| 7,031,717 B2 * | 4/2006 | Mazzara | ...................... 455/450 |
| 7,167,463 B2 * | 1/2007 | Alapuranen | .................. 370/338 |
| 2002/0107013 A1 * | 8/2002 | Fitzgerald | .................... 455/423 |
| 2006/0089099 A1 * | 4/2006 | Buchwald et al. | ........... 455/41.2 |

* cited by examiner

*Primary Examiner*—Lana N Le
*Assistant Examiner*—Ping Y Hsieh
(74) *Attorney, Agent, or Firm*—Fay Kaplun & Marcin, LLP

(57) ABSTRACT

Described is a system and method for assigning a frequency to an access point in a wireless network comprising a plurality of access points. The system and method includes accessing a rule-base to obtain a set of rules for the wireless network, accessing a license database to obtain information about relevant wireless nodes in a region, creating a list of possible primary node frequencies from a list of frequencies associated with primary wireless nodes in the license database, creating a list of possible secondary node frequencies from a list of frequencies associated with secondary wireless nodes in the license database, identifying a list of clear frequencies from a set of unused frequencies, selecting a frequency from frequencies in the lists of possible primary node frequencies, possible secondary node frequencies, and clear frequencies and registering the frequency in the license database.

21 Claims, 3 Drawing Sheets

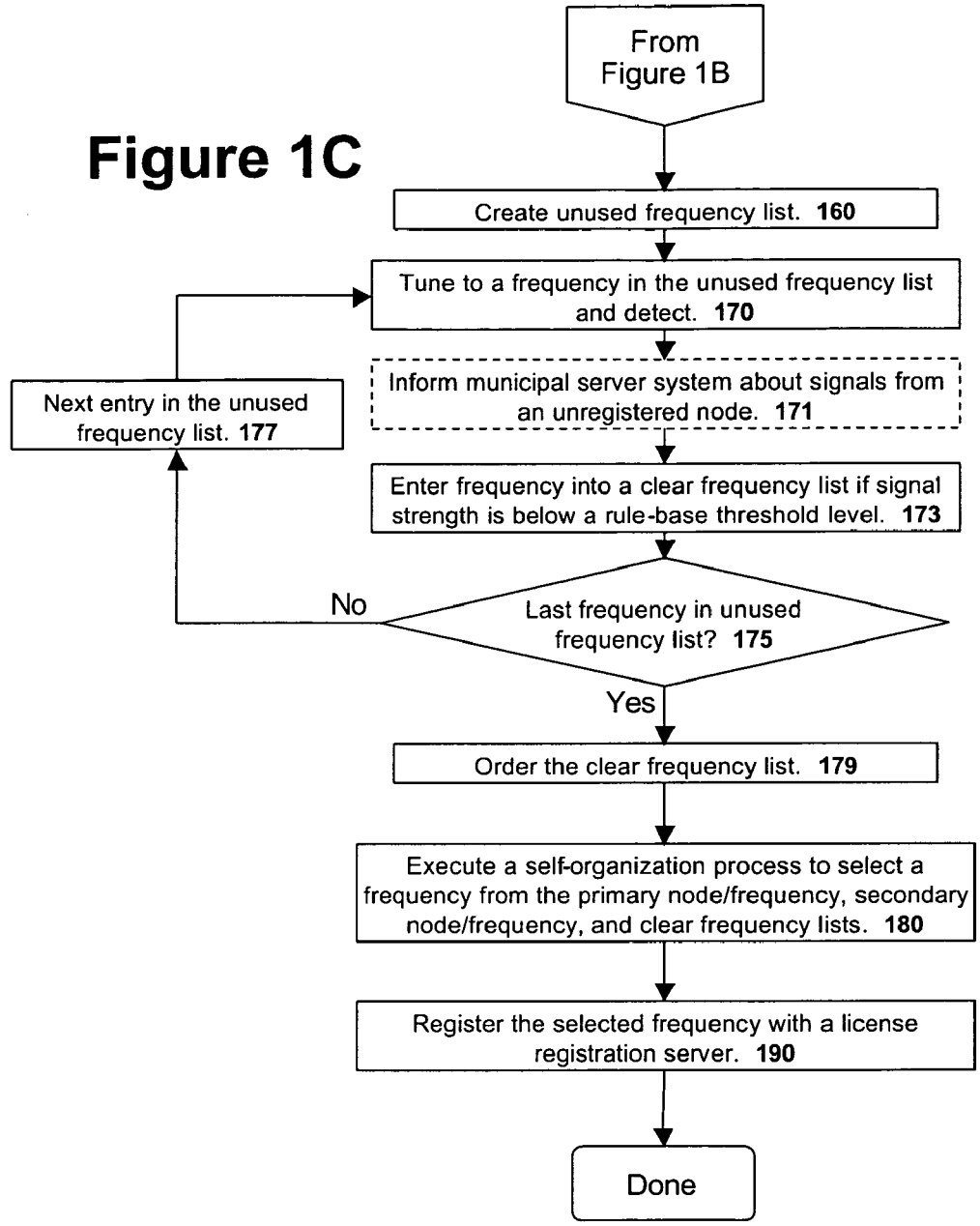

SPECTRUM MANAGEMENT SYSTEM FOR MUNICIPAL SPECTRUM USING GUIDED COGNITIVE RADIO

BACKGROUND

The electromagnetic spectrum is a limited resource. In the United States, the Federal Communication Commission (FCC) is responsible for allocating the bandwidth of the electromagnetic spectrum. Specifically, the Communications Act of 1934 established the FCC and gave the FCC a broad grant of power to regulate spectrum "in the public interest." The FCC is constantly working to ensure that the electromagnetic spectrum is allocated and assigned in a manner that minimizes or eliminates interference so that the American people receive the maximum benefits of wireless technologies and services.

A number of the frequency bands in the electromagnetic spectrum are assigned for unlicensed "open use" wherein multiple different broadcasters and receivers use the same frequency range for communication. The sharing is generally accomplished by limiting the broadcast power such that only receivers within a small area around a transmitter will be able to receive the broadcast. As long as different transmitters are not located within the same area, there will be no interference between the different users of the same frequency band.

With consumers purchasing large numbers of such unlicensed open use wireless equipment, interference between devices is becoming increasingly common. This problem is especially acute in urban areas. Thus, it would be desirable to have other methods of sharing a common frequency band in a more organized and more efficient manner.

SUMMARY OF THE INVENTION

A method for assigning a frequency to an access point in a wireless network comprising a plurality of access points. The method includes accessing a rule-base to obtain a set of rules for the wireless network, accessing a license database to obtain information about relevant wireless nodes in a region, creating a list of possible primary node frequencies from a list of frequencies associated with primary wireless nodes in the license database, creating a list of possible secondary node frequencies from a list of frequencies associated with secondary wireless nodes in the license database, identifying a list of clear frequencies from a set of unused frequencies, selecting a frequency from frequencies in the lists of possible primary node frequencies, possible secondary node frequencies, and clear frequencies and registering the frequency in the license database.

A broadband wireless network system, the broadband wireless network system including a wired network, a rule-base, the rule-base comprising a set of rules for the wireless network, a license database, the license database comprising information about all relevant wireless nodes in a region and a plurality of access points, the access points coupled to the wired network, each of the access points executing a guided cognitive radio assignment program for selecting an operating frequency.

An access point comprising a memory storing a set of instructions and a processor to execute the set of instructions. The set of instructions being operable to access a rule-base to obtain a set of rules for the wireless network, access a license database to obtain information about relevant wireless nodes in a region, create a list of possible primary node frequencies from a list of frequencies associated with primary wireless nodes in the license database, create a list of possible secondary node frequencies from a list of frequencies associated with secondary wireless nodes in the license database, identify a list of clear frequencies from a set of unused frequencies, select a frequency from frequencies in the lists of possible primary node frequencies, possible secondary node frequencies, and clear frequencies and register the frequency in the license database.

BRIEF DESCRIPTION OF THE DRAWINGS

FIGS. 1A, 1B and 1C illustrate a high-level flow diagram that sets forth steps that an access point may follow to join a guided cognitive radio system according to the teachings of the present invention.

DETAILED DESCRIPTION

Figure 1A:
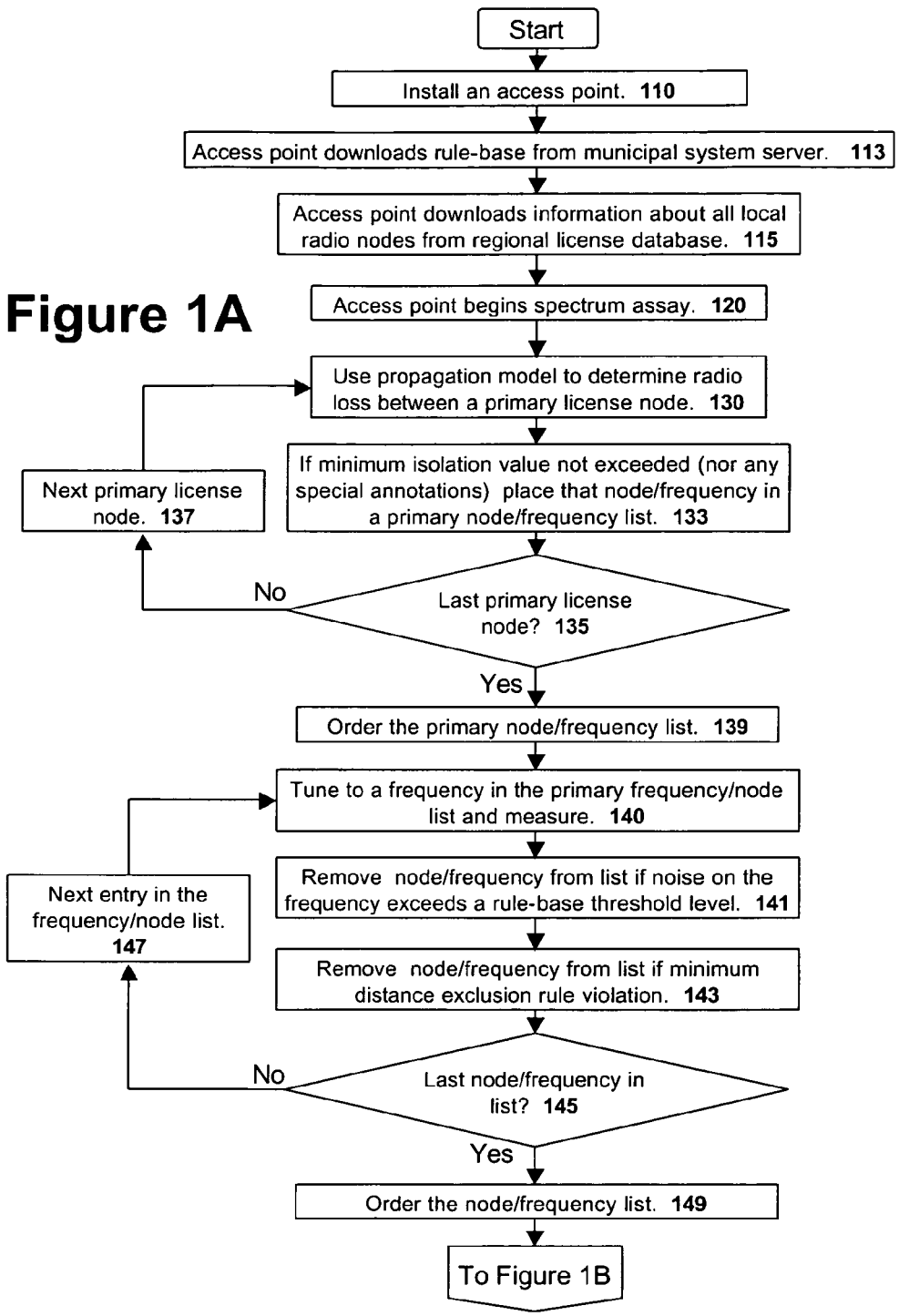

The present invention may be further understood with reference to the following description and the appended drawings, wherein like elements are referred to with the same reference numerals. The exemplary embodiment of the present invention describes a system and a method for classification of network traffic to classify a network entity in advance of an impact thereof on a network. A classification of the entity determined as a function of a response generated as a result of a stress test performed thereon, as will be described below.

Overview of Metropolitan Area Networks

Many cities have realized the value of unified wireless broadband packet access to citizens, municipal workers, and emergency responders. "Metropolitan Area Networks" or MANs (e.g. 802.16/WiMAX) can provide such wireless broadband data communication service, but because of their large-cell architecture, eventually become incapable of supplying sufficient throughput per user. Fourth-generation (4G) small-cell systems divide their maximum throughput over a much smaller area, and hence offer much higher throughput per user. Such "Neighborhood Area Networks" (NANs) can reuse spectrum much more densely, and as a result can also utilize spectrum more efficiently.

A number of cities have begun using pre-4G WiFi hardware to pioneer broadband "Digital City" access concepts in order to bridge the "Digital Divide" (lack of internet access by the disadvantaged), lower municipal communications costs, and provide a source of revenue as a digital communication utility. These early manifestations have attempted to capitalize upon unlicensed spectrum such as ISM or U-NII bands for outdoor service, leveraging the success systems such as WiFi have had indoors.

Although workable for best-effort data traffic, use of unlicensed bands forces the system to contend with interference controlled only by FCC-prescribed device emission limits. Uncontained by building walls, emissions travel further outdoors, increasing interference potential from a variety of sources. As municipal systems mature and traffic grows to become more multimedia rich, interference will eventually limit the ability to provide reliable communications and Quality of Service (QoS) for streaming services just as citizens and city employees begin to depend on it. The prospect jeopardizes investment in Digital City wireless infrastructure.

As a result of municipality concerns regarding the expenditures for early Digital City implementations, examination of spectrum options has become an important topic. The topic has ignited revisitation of broadband telecommunications policy at the Federal level and new spectrum regulations by the FCC. A particularly rich area of discussion has been the concept of a spectrum "Commons" where a group of users may be licensed to use a block of spectrum for designated uses (rather than particular devices, as with the ISM and U-NII bands). Such a spectrum commons requires some type of system of mediating access to the spectrum between the various users.

Cognitive Radio

To efficiently mediate the use of spectrum, the technology of "Cognitive Radio" may be used. Cognitive radio technology uses a combination of computerized intelligence and frequency-agile radio receivers to examine prospective spectrum for a radio service by conducting an examination of frequencies in the band where the equipment is capable of operating. Following the survey of the frequency band, cognitive radio software attempts to categorize received emissions according to type and subsequently determines if particular channels in the frequency band could be used by the node without causing troublesome interference to existing users.

As a matter of practice, most emerging cognitive radio implementations do not use information to provide "initial conditions" for the channel search, other than the frequency band allocation itself. Although cognitive radio is an exciting prospect, the degree of artificial intelligence required to properly survey, interpret, and categorize all of the collected information and then estimate interference potential may be considerable. Consequently, the wide use of cognitive radio technology without sufficient operating experience should not be undertaken as it could hazard many services which might share common spectrum.

To remedy problems within existing cognitive radio technology, the present invention proposes a novel system using a combination of "guided" cognitive radio. Specifically, guided cognitive radio is used in combination with a secure database and an "automatic licensing" server to reduce the possibility that an uncontrolled cognitive radio system could misbehave and thus damage the value of an entire frequency band. In this manner, a cognitive radio system that efficiently mediates frequency band usage may be safely deployed.

The system of the present invention has been innovated in conjunction with a companion "Municipal Spectrum" regulatory concept that has recently been exposed to the FCC, a group of Public Utility Commissions, and several cities entertaining plans of converting to the utility model for broadband wireless access. The municipal spectrum concept will be disclosed as one possible implementation of the teachings in this document in order to illustrate how the proposed spectrum management system would work. However those skilled in the art will recognize that the idea can be applied to other spectrum mediation situations.

In one municipal spectrum implementation of the present invention, it is recommended that cities apply for Digital City status and be granted secondary user status in the existing 6 GHz microwave relay band. In the 6 GHz microwave relay band, primary users are licensed to operate point-to-point microwave relays between fixed, geographically designated points at specified power levels and with specified antenna configurations. The municipal spectrum system having secondary user status should operate without interfering with the primary point-to-point licensees.

It should be noted that Secondary use status already has a precedent in FCC-regulated bands and many such secondary services have already been designated. These services must cease operation if they cause interference to the primary licensed operations. However, experience has shown that primary and secondary uses can cooperate in the same spectrum band if their uses and architectures are disparate enough to minimize interactions.

The envisioned benefit of municipal spectrum system as described herein would accrue only to registered cities that would be granted secondary license status if they apply for Digital City operation. A particular instantiation of a Digital City 4G network could be, for example, the "HomeRun" system innovated by AT&T. In the HomeRun system, outdoor coverage is established by a network of outdoor access points that illuminate areas up to a radius of approximately 1000 feet. Within the coverage area, links can be close to outdoor mobile devices and to "window bridges" installed within premises that join self-organized indoor networks to the outdoor network. With the proposed municipal spectrum implementation, the outdoor portion of such an indoor/outdoor wireless broadband service is proposed to operate in the 6 GHz band (it currently operates at the high frequency end of the Unlicensed-NII band at near 5.8 GHz). The frequency displacement is sufficiently small to allow current radio architectures and integrated circuit designs to make the transition with few modifications.

Cognitive radio is essentially a substitute for human coordination of spectrum. The 'guided cognitive radio' system of the present invention proposes an intermediate step between a manual spectrum management process and a completely artificial-intelligence (AI) based spectrum management process. A major value component of the "guided" cognitive radio concept (aside from safely accumulating experience with the technique) is that the automated spectrum management approach of guided cognitive radio makes control of small-cell architectures more economical. Furthermore, the guided cognitive radio system ensures that municipalities are provided some protection from interference whereas this is generally not available to unlicensed operation outdoors. The automated spectrum management is a necessary improvement, since 4G NAN systems may utilize more than 100 small cells to serve the same area covered by one 3 Km. MAN cell.

The guided cognitive radio system of the present invention utilizes a stored program resident on an outdoor access point outfitted to utilize municipal spectrum. Each access point contains either a Global Positioning Service (GPS) device or geographic location coordinates programmed at the time of its installation (if the access point is fixed) so the exact location is known by the access point's program. The program executes six functions: municipal rule-base download, spectrum assay, secure database access, propagation modeling, secure license registration, and municipal access point status notification.

Figure 1B:
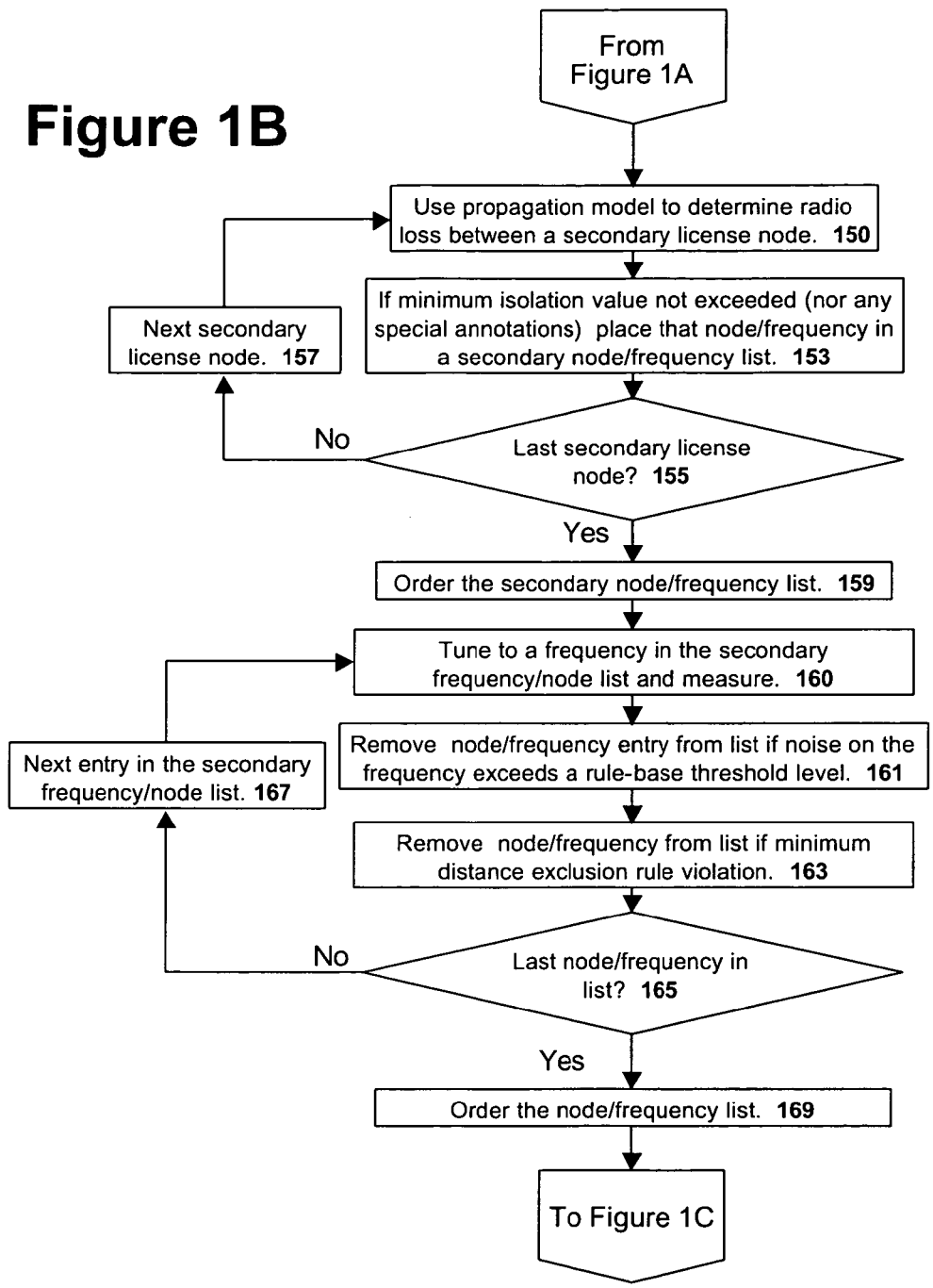

The access point software works in concert with a municipal system server, a license database server and a license registration server, all of which are coupled with a data communication network. The data communication network may be a broadband packet network such as the Internet. The latter two servers may be combined into a single facility. FIGS. 1A, 1B and 1C illustrate a high-level flow diagram that sets forth the steps that an access point may follow in one embodiment of the present invention in a municipal spectrum system.

Initially, an access point is installed at step 110. As set forth, the installation requires a connection to a wired data communication network. Following the mechanical and electrical installation, a newly-connected outdoor access point uses its network connection to establish contact with a secure municipal system server to begin the process of integrating itself into the municipal spectrum system. The access point downloads an operations rule-base from the secure municipal system server as set forth in step 113. Ideally, this download is performed using a secure communication means such as IPSec. The operations rule-base downloaded from the secure municipal system server provides the Access Point with policies for the municipal system such as excluded frequencies, reserved frequencies, common pool frequencies, maximum power allowances, and other system operating information for the municipal system.

Next, the access point contacts the regional license database server. This regional license database may be maintained by the Federal Communication Commission (FCC) or by a nominated private agent. The regional license database contains detailed information about all the primary (point-to-point relay) and secondary (municipal) radio nodes in the area. The information may include by is not limited to geographic locations as well as heights, frequencies, bandwidths, emission types, power levels, and antenna configurations. Special annotations may also be provided to indicate that no secondary operation must occur on certain frequencies within a minimum distance, as might be the case for military (e.g. radar), governmental, scientific, or other primary commercial applications (e.g. carrier network-related). The access point downloads this information about all the local radio nodes as set forth in step 115. As with the connection to the municipal system server, this download is ideally performed using a secure communication means such as IPSEC.

After obtaining information from both the municipal system server and the regional license database, the access point then conducts a spectrum assay using its radio hardware as set forth in step 120. The spectrum assay is initially performed on the database-listed frequencies and subsequently on other frequencies marked for use. Note that some frequencies may be marked as excluded by the local municipal rule-base.

For each primary-license node in the license database, the access point uses a propagation model program to estimate how the signals associated with that node's frequency will behave. Specifically, the access point supplies the access point's own geographic location along with the geographic location and characteristics of that primary-license radio node to the propagation model program to estimate the radio loss between the two nodes as set forth in step 130. The propagation model may take into account local topography (e.g. downloaded topographic map data), distance, spreading, diffraction, and other attenuation effects.

The result of the propagation model's operation is an estimation of the loss in dB that may be expected to isolate operations between the two radio nodes on that primary-license node's frequency. If no special annotations are present for that frequency or node and the rule-base minimum isolation value is not exceeded then that particular frequency may be marked for "cooperation-primary" use and is placed in an ordered frequency/node list as set forth in step 133. Steps 135 and 137 ensure that steps 130 and 133 are applied to every primary license node obtained from the regional license database. Finally, the frequency/node list entries are ordered by isolation value with highest isolation first as set forth in step 139.

Next, at step 140, the access point begins to tune into to each frequency in the created frequency/node list to test the different various frequencies that may be used. In particular, the noise level on the frequency is tested. If the noise on the frequency exceeds a rule-base threshold level then that node/frequency entry is removed from the frequency list as set forth in step 141. This removal is done on the assumption that extraordinary propagation effects not taken into account by the propagation model may be present. The access point then determines if the node/frequency entry falls within the parameters of a minimum distance exclusion rule used to keep radio nodes that use the same frequency a minimum distance apart. Those node/frequency entries that violate the minimum distance exclusion rule are removed from the list as set forth in step 143. Steps 145 and 147 ensure that steps 140, 141, and 143 are applied to every node/frequency entry in the frequency/node list. Finally, at step 149, the access point reorders the node/frequency list according to measured noise level with the smallest measured noise level first.

The access point then utilizes a propagation model to similarly examine interference potential to other municipal secondary-licensed access points that are already part of the license database as secondary-use licenses as set forth in step 150. The propagation model may be the same used in the earlier steps concerning primary licensees or another propagation model more appropriate for small cell, low antenna height PTMP municipal networks. As before, the propagation model uses geographic locations of the access point and the other secondary-license access point to estimate attenuation between the two nodes. This test discloses other municipal network nodes in the area that may be isolated sufficiently (i.e. below the rule-base threshold for secondary use) and that the frequencies upon which they operate can be reused with no significant interference. Similarly, these frequencies that can be isolated sufficiently are then added to a "cooperation-secondary" node/frequency list as set forth in step 153. At step 159, the secondary node/frequency list is ordered by isolation value with the highest isolation value first.

The access point then tunes to each frequency in the secondary node/frequency list as set forth in step 160. If noise on a particular frequency exceeds the secondary rule-base threshold, the channel entry is removed as set forth in step 161. Similarly, if any rule-base constraints obtained from the municipal server such as minimum distance apply then that node/frequency is also removed from the secondary node/frequency list as set forth in step 163. Finally, the access point reorders the secondary node/frequency list according to measured noise level with the smallest noise level first as set forth in step 169.

The access point then creates a list of frequencies that are within the band but not part of the excluded or reserved lists downloaded from the municipal server or not currently listed in the regional license database as set forth in step 160. Since there is no geographic location information for these frequencies that identifies a transmission origination point, the access point cannot measure interference potential using a propagation model. Instead, the access point can only tune into the unused frequencies and measure the signal properties as set forth in step 170. If any frequency appears to show signals from an unregistered (unlicensed) node then the access point may provide this information to the municipal system server as set forth in step 171. However, such a frequency is not marked for potential use. Such unlicensed emissions may occur due to latency between the license registration and license database servers, or could result from illegal transmitters or "splatter" due to adjacent frequency front-end overload. At step 173, the access point enters frequencies from the unused frequency list that were measured to be below the rule-base signal-strength threshold into a "clear" frequency list. After testing all of the unused frequencies, the access point then orders the clear frequency list by noise level with the lowest noise level frequency first as set forth in step 179.

At this point, the access point has collected three groups of frequencies for possible use as part of an organized municipal network: a list of frequencies occupied by licensed primary operations (the primary node/frequency list), frequencies occupied by licensed secondary nodes (the secondary node/ frequency list), and a third list corresponding to channels not licensed and apparently "clear" (the clear frequency list).

Next, at step 180, the access point may execute a "self-organization" process particular to the municipal system being installed. An example of such a self-organization process is disclosed in a patent issued to M. Benveniste in conjunction with an indoor cellular system. The teachings of U.S. Pat. Nos. 6,775,549, Method for self-calibration of a wireless communication system, 6,615,040, Self-configurable wireless systems: spectrum monitoring in a layered configuration, and 6,259,922, Managing interference in channelized cellular systems are hereby incorporated by reference in their entirety.

A self-organization process uses the ordered lists of candidate frequencies to converge to a sub-optimal frequency assignment for each participating access point in the municipal network. The basic Benveniste process would be modified to use frequencies from the clear frequency lists, the primary node/frequency list, and the secondary node/frequency list in that order of preference. Since each individual access point in the network has arrives at its own list of valid frequencies, the iterative reuse-optimization process is constrained by the entries in each access point's frequencies list. If the database indicates that one or more access points of the particular system is already in the database, the implication is that those access points are already operating. Accordingly, those access points may be assumed to have already completed at least one self-organization cycle and registered automatically for licenses. If this is the case, the access point must first coordinate with the local municipal server and possibly the other access points already in the established network to schedule a "reconfiguration" cycle. Detailed information about this process is set forth in the previously identified Benveniste patent. If there are no existing municipal (secondary-use) access points already operating, the access point contacts the municipal system server and negotiates use of the lowest noise frequency on the clear frequency list.

Those skilled in the art will recognize that the self-organization process may be a distributed process or a centralized process. If a distributed process is employed, individual access points would each contain a program that would interact with other access points to converge to a sub-optimal frequency plan. In the case where no other network access points are reachable, the access point would then choose the lowest-noise frequency from the clear frequency list autonomously.

After an access point has completed the spectrum "examination" and "organization" phases of the process, the access point then performs a final "registration" phase at step 190. The frequency that the access point will use has been determined by the self-organization algorithm, by recommendation to the municipal system server of the preferred (lowest-noise) "clear" channel, or by autonomously selecting an operating frequency. The registration phase begins with the access point contacting the license registration server. Ideally, the contact is performed using a secure communication means such as IP-Sec or another security protocol. The license registration server's function is to implement a machine-to-machine (M2M) licensing procedure that will create a "virtual" license for each access point registering with the correct credentials. These credentials may include but are not limited to a security code that may be installed during access point installation, a geographic location, and the municipal Digital City authorization number. After forwarding this information and obtaining authentication from the license server, the access point sends its proposed operating frequency, selected power level, bandwidth, antenna configuration, emission type, height, and other information which may be later determined as valuable for coordination.

The license registration server accepts the information and stores the information in a registered license database. The license registration server then issues a certification code to the access point. The certification code provides the access point with proof that it is operating legally and that a "virtual" license has been issued based on the parameters the access point submitted to the license registration server. If the access point is operating in conjunction with a municipal server then the access point sends the certification code to that municipal server along with the operating information that is linked to the license.

Subsequently, the license registration server sends the new license information, using a secure connection, to the license database server. The license database server updates the information accessible to other access points that may subsequently wish to join the wireless network. The license database is also updated when new microwave point-to-point links (primary licensees) are licensed. As a primary licensee, a point-to-point link installation may impact one or more access points (secondary licensees) that may be located along the boresight path of the point-to-point link. This may require a rearrangement of access point frequencies in order to eliminate interference. Such a rearrangement would be initiated when the license registration server marks the database with a "new primary license" indication.

Access points already licensed must periodically coordinate with the license database in order to determine if the new information impacts operation. In one embodiment, each access point may contact the license database at least twice in each 24 hour period. If operation is impacted then a frequency reorganization with appropriate system frequency changes must be initiated immediately following the impact determination. In one embodiment, the frequency reorganization is performed within 1 day. Furthermore, the reorganization should be performed when the system is minimally used. The Benveniste self-organization process contains a method for accommodating such changes while connections/sessions are in progress.

In one preferred embodiment, each access point may also be outfitted with the capability for being commanded to shut down its transmitter immediately by command. Such shut down commands may be sent from the municipal system server or other server operated by a sanctioned governing or regulatory body. This shut-down capability is necessary to meet the requirement of secondary use that it shall not interfere with primary use(s) and must be taken off the air if interference occurs.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method for assigning a frequency to an access point in a wireless network comprising a plurality of access points, the method comprising:
   accessing a rule-base to obtain a set of rules for the wireless network, the rule-base including
      a minimum isolation value, wherein frequencies exceeding the minimum isolation value are eliminated from a list of clear frequencies,
      a noise threshold level wherein frequencies exceeding the noise threshold level are eliminated from the list of clear frequencies, and a minimum distance exclusion rule wherein frequencies violating the minimum distance exclusion rule are eliminated from the list of clear frequencies;

accessing a license database to obtain information about relevant wireless nodes in a region;

creating a list of possible primary node frequencies from a list of frequencies associated with primary wireless nodes in the license database;

creating a list of possible secondary node frequencies from a list of frequencies associated with secondary wireless nodes in the license database;

identifying the list of clear frequencies from a set of unused frequencies;

selecting a frequency from frequencies in the lists of possible primary node frequencies, possible secondary node frequencies, and clear frequencies, wherein the frequency is selected from the lists is in a predetermined order of, first, the clear frequencies list, second, the primary node frequencies list and, third, the secondary node frequencies list; and registering the frequency in the license database.

2. The method as set forth in claim 1, wherein creating a list of possible primary node frequencies from a list of frequencies associated with primary wireless nodes in the license database comprises:

eliminating unsuitable frequencies in the list of frequencies associated with primary wireless nodes in the license database by applying a propagation model and the set of rules; and eliminating unsuitable frequencies in the list of frequencies associated with primary wireless nodes in the license database by testing the list of frequencies associated with primary wireless nodes and applying the set of rules.

3. The method as set forth in claim 2, wherein applying a propagation model and the set of rules comprises eliminating frequencies that exceed the minimum isolation value.

4. The method as set forth in claim 2, wherein testing the list of frequencies associated with primary wireless nodes and applying the set of rules comprises eliminating frequencies that exceed the noise threshold value.

5. The method as set forth in claim 2, wherein testing the list of frequencies associated with primary wireless nodes and applying the set of rules comprises eliminating frequencies associated with nodes that do not fulfill the minimum distance exclusion rule.

6. The method as set forth in claim 2, wherein creating a list of possible primary node frequencies from a list of frequencies associated with primary wireless nodes in the license database further comprises:

ordering the list of possible primary node frequencies by isolation value.

7. The method as set forth in claim 2, wherein creating a list of possible primary node frequencies from a list of frequencies associated with primary wireless nodes in the license database further comprises:

ordering the list of possible primary node frequencies by noise level.

8. The method as set forth in claim 1, wherein creating a list of possible secondary node frequencies from a list of frequencies associated with secondary wireless nodes in the license database comprises:

eliminating unsuitable frequencies in the list of frequencies associated with secondary wireless nodes in the license database by applying a propagation model and the set of rules; and eliminating unsuitable frequencies in the list of frequencies associated with secondary wireless nodes in the license database by testing the list of frequencies associated with secondary wireless nodes and applying the set of rules.

9. The method as set forth in claim 8, wherein applying a propagation model and the set of rules comprises eliminating frequencies that exceed the minimum isolation value.

10. The method as set forth in claim 8, wherein testing the list of frequencies associated with primary wireless nodes and applying the set of rules comprises eliminating frequencies that exceed the noise threshold value.

11. The method as set forth in claim 8, wherein testing the list of frequencies associated with primary wireless nodes and applying the set of rules comprises eliminating frequencies associated with nodes that do not fulfill the minimum distance exclusion rule.

12. The method as set forth in claim 8, wherein creating a list of possible secondary node frequencies from a list of frequencies associated with primary wireless nodes in the license database further comprises:

ordering the list of possible secondary node frequencies by isolation value.

13. The method as set forth in claim 8, wherein creating a list of possible primary node frequencies from a list of frequencies associated with secondary wireless nodes in the license database further comprises:

ordering the list of possible secondary node frequencies by noise level.

14. The method as set forth in claim 1, wherein selecting a selected frequency from frequencies in the lists of possible primary node frequencies, possible secondary node frequencies, and clear frequencies comprises executing a self-organization process that converges to a sub-optimal frequency assignment.

15. The method as set forth in claim 1, wherein identifying the list of clear frequencies from a set of unused frequencies comprises:

measuring set of unused frequencies; and eliminating frequencies in the set of unused frequencies having a signal strength exceeding a signal-strength threshold value.

16. A broadband wireless network system, the broadband wireless network system comprising:

a wired network;

a rule-base, the rule-base comprising a set of rules for the wireless network, the rule-base including a minimum isolation value, wherein frequencies exceeding the minimum isolation value are eliminated from a list of clear frequencies, a noise threshold level wherein frequencies exceeding the noise threshold level are eliminated from the list of clear frequencies, and a minimum distance exclusion rule wherein frequencies violating the minimum distance exclusion rule are eliminated from the list of clear frequencies;

a license database, the license database comprising information about all relevant wireless nodes in a region; and a plurality of access points, the access points coupled to the wired network, each of the access points comprising a memory storing a guided cognitive radio assignment program and a processor configured to execute the guided cognitive radio assignment program, the guided cognitive radio assignment program including steps to select an operating frequency, the operating frequency being selected from one of a plurality of lists including available frequencies, the frequency being selected from the lists in a predetermined order of first, the list of clear frequencies, second, a list of possible primary node frequencies and, third, a list of possible secondary node frequencies.

17. The broadband wireless network system as claimed in claim 16 comprising a memory storing the guided cognitive radio assignment program and a processor configured to execute the guided cognitive radio assignment program, the guided cognitive radio assignment program including the steps of:
creating the list of possible primary node frequencies from a list of frequencies associated with primary wireless nodes in the license database;
creating the list of possible secondary node frequencies from a list of frequencies associated with secondary wireless nodes in the license database;
creating the list of clear frequencies from a set of unused frequencies;
selecting a selected frequency from frequencies in the lists of possible primary node frequencies, possible secondary node frequencies, and clear frequencies; and
registering the selected frequency in the license database.

18. The broadband wireless network system as claimed in claim 17 wherein creating a list of possible primary node frequencies from a list of frequencies associated with primary wireless nodes in the license database comprises applying a propagation model and the set of rules to the list of frequencies associated with primary wireless nodes in the license database.

19. The broadband wireless network system as claimed in claim 17 wherein creating the lists of possible primary node frequencies, possible secondary node frequencies, and clear frequencies comprises applying a propagation model to and the set of rules to the frequencies.

20. The broadband wireless network system as claimed in claim 17 wherein creating the lists of possible primary node frequencies, possible secondary node frequencies, and clear frequencies comprises measuring frequencies and applying the set of rules to the frequencies.

21. An access point comprising a memory storing a set of instructions and a processor to execute the set of instructions, the set of instructions being operable to:
access a rule-base to obtain a set of rules for the wireless network, the rule-base including
a minimum isolation value, wherein frequencies exceeding the minimum isolation value are eliminated from a list of clear frequencies,
a noise threshold level wherein frequencies exceeding the noise threshold level are eliminated from the list of clear frequencies, and
a minimum distance exclusion rule wherein frequencies violating the minimum distance exclusion rule are eliminated from the list of clear frequencies;
access a license database to obtain information about relevant wireless nodes in a region;
create a list of possible primary node frequencies from a list of frequencies associated with primary wireless nodes in the license database;
create a list of possible secondary node frequencies from a list of frequencies associated with secondary wireless nodes in the license database;
identify the list of clear frequencies from a set of unused frequencies;
select a frequency from frequencies in the lists of possible primary node frequencies, possible secondary node frequencies, and clear frequencies, wherein the frequency is selected from the lists is in a predetermined order of, first, the clear frequencies list, second, the primary node frequencies list and, third, the secondary node frequencies list; and
register the frequency in the license database.

* * * * *